United States Patent
Dong

(10) Patent No.: US 12,245,210 B2
(45) Date of Patent: Mar. 4, 2025

(54) RESOURCE ALLOCATION DATA PROCESSING METHOD, COMMUNICATION DEVICE, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 375 days.

(21) Appl. No.: 17/787,160

(22) PCT Filed: Dec. 19, 2019

(86) PCT No.: PCT/CN2019/126705
§ 371 (c)(1),
(2) Date: Jun. 17, 2022

(87) PCT Pub. No.: WO2021/120121
PCT Pub. Date: Jun. 24, 2021

(65) Prior Publication Data
US 2023/0038358 A1    Feb. 9, 2023

(51) Int. Cl.
*H04W 72/0453*    (2023.01)

(52) U.S. Cl.
CPC ............... *H04W 72/0453* (2013.01)

(58) Field of Classification Search
CPC ........... H04W 72/0453; H04W 72/541; H04W 72/21; H04W 72/27; H04W 84/12
See application file for complete search history.

(56) References Cited

U.S. PATENT DOCUMENTS

| 2012/0257574 A1* | 10/2012 | Seok | H04W 72/541 |
| | | | 370/328 |
| 2015/0249990 A1* | 9/2015 | Kadiyala | H04W 72/542 |
| | | | 370/252 |
| 2016/0066196 A1* | 3/2016 | Jiang | H04W 72/27 |
| | | | 370/329 |
| 2016/0157195 A1* | 6/2016 | Wang | H04W 56/001 |
| | | | 370/350 |

(Continued)

FOREIGN PATENT DOCUMENTS

| CN | 104185188 A | 12/2014 |
| CN | 106793096 A | 5/2017 |

(Continued)

OTHER PUBLICATIONS

ISA State Intellectual Property Office of the People's Republic of China, International Search Report Issued in Application No. PCT/CN2019/126705, Sep. 23, 2020, WIPO, 4 pages.

(Continued)

Primary Examiner — Robert C Scheibel
(74) Attorney, Agent, or Firm — Volpe Koenig

(57) ABSTRACT

Examples of the present disclosure provide a data processing method and apparatus, a communication device and a storage medium. Being applied to a first Access Point (AP), the data processing method includes: resource allocation information of one or more second Basic Service Sets (BSSs) that use a same frequency band as a first BSS for the first AP is acquired; and a resource is allocated to a station within the first BSS according to the resource allocation information.

18 Claims, 4 Drawing Sheets

(56) References Cited

U.S. PATENT DOCUMENTS

| | | | |
|---|---|---|---|
| 2017/0019923 A1* | 1/2017 | Agardh | H04W 74/0808 |
| 2018/0054818 A1 | 2/2018 | Kumar et al. | |
| 2018/0084548 A1 | 3/2018 | Alexander et al. | |
| 2023/0328622 A1* | 10/2023 | Park | H04W 16/28 370/328 |
| 2024/0172138 A1* | 5/2024 | Tong | H04W 28/16 |

FOREIGN PATENT DOCUMENTS

| | | |
|---|---|---|
| CN | 107567108 A | 1/2018 |
| CN | 107580368 A | 1/2018 |
| CN | 108029113 A | 5/2018 |

OTHER PUBLICATIONS

State Intellectual Property Office of the People's Republic of China, Office Action and Search Report Issued in Application No. 201980003631X, May 26, 2022, 16 pages. (Submitted with Machine/Partial Translation).

Hewlett Packard Enterprise, "Further Implications of Wi-Fi Field Measurements for Multi-Node Testing", 3GPP TSG-RAN WG4 Meeting #82 Athens, Greece Feb. 13-17, 2017, R4-1701879, 10 pages.

* cited by examiner

RESOURCE ALLOCATION DATA PROCESSING METHOD, COMMUNICATION DEVICE, AND STORAGE MEDIUM

CROSS-REFERENCE TO RELATED APPLICATION

The present application is the U.S. national phase of PCT Application No. PCT/CN2019/126705 filed on Dec. 19, 2019, the content of which is incorporated herein by reference in its entirety for all purposes.

TECHNICAL FIELD

The present disclosure relates to, but is not limited to, the field of wireless communication, and in particular relates to a data processing method, a data processing apparatus, a communication device and a storage medium.

BACKGROUND

The Institute of Electrical and Electronics Engineers has established a Study Group (SG) to study the next generation of mainstream Wi-Fi technologies, and the scope of the study includes technologies such as Wi-Fi transmission with a bandwidth of 320 MHz, aggregation and cooperation of a plurality of frequency bands. The proposed vision is to, compared with the existing 802.11ax standard, increase the rate and throughput by at least four times. The new technology is mainly applied to scenarios such as video transmission, Augmented Reality (AR), Virtual Reality (VR). However, in practical applications, it is found that frequency interference exists in scenarios with a cross coverage of a plurality of Access Points (APs).

SUMMARY

Examples of the present disclosure provide a data processing method and apparatus, a communication device and a storage medium.

According to a first aspect of examples of the present disclosure, there is provided a data processing method, being applicable to a first Access Point (AP). The method includes:
acquiring resource allocation information of one or more second Basic Service Sets (BSSs) that use a same frequency band as a first BSS for the first AP; and
allocating, according to the resource allocation information, a resource to a station (STA) within the first BSS.

According to a second aspect of examples of the present disclosure, there is provided a data processing method, being applicable to a station (STA). The method includes:
receiving resource allocation information of one or more second Basic Service Sets (BSSs) which is broadcast by a second Access Point (AP); and
reporting the resource allocation information of the one or more second BSSs to a first AP configured with a first BSS, where the first BSS and the one or more second BSSs are BSSs of a same frequency band.

According to a third aspect of examples of the present disclosure, there is provided a data processing apparatus, being applicable to a first Access Point (AP). The apparatus includes:
an acquiring unit, configured to acquire resource allocation information of one or more second Basic Service Sets (BSSs) that use a same frequency band as a first BSS for the first AP; and
an allocating unit, configured to allocate, according to the resource allocation information, a resource to a station (STA) within the first BSS.

According to a fourth aspect of examples of the present disclosure, there is provided a data processing apparatus, being applicable to a station (STA). The apparatus includes:
a receiving unit, configured to receive resource allocation information of one or more second Basic Service Sets (BSSs) which is broadcast by a second Access Point (AP); and
a reporting unit, configured to report the resource allocation information of the one or more second BSSs to a first AP configured with a first BSS, where the first BSS and the one or more second BSSs are BSSs of a same frequency band.

According to a fifth aspect of examples of the present disclosure, there is provided a communication device, including:
a transceiver;
a memory; and
a processor connected to the transceiver and the memory respectively is configured to, by executing computer-executable instructions stored on the memory, perform the data processing method provided in any one of the above-mentioned first aspect and/or second aspect.

According to a sixth aspect of examples of the present disclosure, there is provided a non-transitory computer readable storage medium, where the non-transitory computer readable storage medium stores computer-executable instructions, in response to the computer-executable instructions being executed by a processor, the data processing method provided in any one of the above-mentioned first aspect and/or second aspect can be performed.

It should be understood that the above general description and the following detailed description are just exemplary and explanatory, and cannot construed as a limit to the present disclosure.

BRIEF DESCRIPTION OF THE DRAWINGS

The drawings herein are incorporated into the specification and constitute a part of the specification, illustrate examples according to the present disclosure, and are used to explain the principle of the present disclosure along with the specification.

DETAILED DESCRIPTION OF THE EMBODIMENTS

Figure 1:
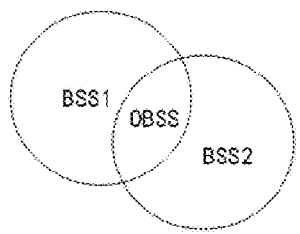
FIG. 1 is a schematic flowchart showing a cross overlap and/or coverage of a plurality of BSSs.

Exemplary embodiments will be described in detail herein, with the illustrations thereof represented in the drawings. When the following descriptions refer to the drawings, like numerals in different drawings refer to like or similar elements unless otherwise indicated. The examples described in the following exemplary embodiments do not represent all examples consistent with embodiments of the present disclosure. Rather, they are merely examples of apparatuses and methods consistent with some aspects of the present disclosure as detailed in the appended claims.

The terms used in the embodiments of the present disclosure are for the purpose of describing particular embodiments only, and are not intended to limit the embodiments of the present disclosure. Terms determined by "a", "the" and "said" in their singular forms in the embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in the embodiments of the present disclosure to describe various information, such information should not be limited to these terms. These terms are only used to distinguish one category of information from another. For example, without departing from the scope of the embodiments of the present disclosure, first information may be referred as second information; and similarly, the second information may also be referred as the first information. Depending on the context, the term "if" as used herein may be interpreted as "when" or "upon" or "in response to determining".

An execution entity involved in examples of the present disclosure includes but is not limited to: a network device in a wireless communication network, especially, a network device operating in a Wi-Fi network, for example, in accordance with IEEE802.11a/b/g/n/ac standard, and a network device operating in accordance with IEEE802.11be standard in a next generation Wi-Fi network. The network device includes but is not limited to: a wireless Access Point (AP), a station (STA) and the like. An STA that communicates wirelessly with an AP can also be called a wireless STA.

An application scenario of the examples of the present disclosure includes: as is stipulated in IEEE 802.11ax standard, for a certain bandwidth, only one Resource Unit (RU) can be assigned to a wireless STA at a time. For improving the utilization efficiency of spectrum, in IEEE 802.11be, a plurality of RUs can be assigned to a wireless STA for a certain bandwidth, and the specific number of RUs that can be assigned to a wireless STA is not determined. As shown in FIG. 1, Basic Service Sets (BSSs) established by a plurality of APs for a communication band may have an overlapping area. This overlapping area indicates Overlapping Basic Service Set (OBSS). In a case that the plurality of BSSs forming the OBSS use the same frequency band, frequency interference may occur.

In FIG. 1, an overlapping area between BSS1 and BSS2 indicates an OBSS.

In examples of the present disclosure, a mechanism is provided to reduce frequency interference caused by wireless communication using the same RU.

Figure 2:
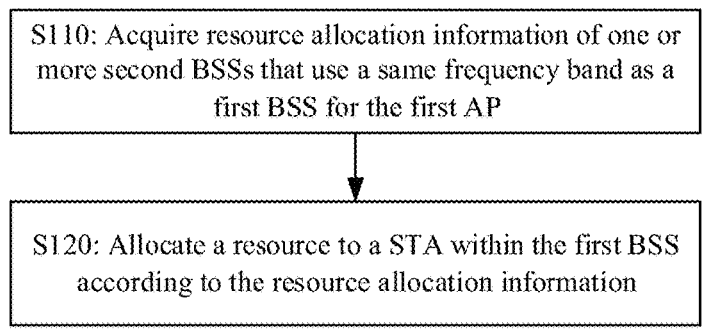
FIG. 2 is a schematic flowchart showing a data processing method according to an example of the present disclosure.

As shown in FIG. 2, the present example provides a data processing method which is applied to a first AP. The method includes the following steps.

At S110, resource allocation information of one or more second BSSs is acquired, where the one or more second BSSs use the same frequency band as a first BSS for the first AP.

At S120, a resource is allocated to an STA within the first BSS according to the resource allocation information.

In examples of the present disclosure, the first AP may be a WI-FI AP. The STA in the examples of the present disclosure may be various terminal devices that access an AP and perform data transmission through a link with the AP. A terminal device may include: a mobile phone, an Internet of Things (IoT) device, or a Machine Type Communication (MTC) device, or a wearable device.

The first AP can acquire the resource allocation information of one or more second BSSs, where the one or more second BSSs are configured by one or more second APs around the first AP and use the same frequency band as the first BSS.

The resource allocation information can be used to indicate the allocation of communication resources within the one or more second BSSs.

After acquiring the resource allocation information, the first AP may refer to the resource allocation information for allocating a resource(s) to a STA(s) within the first BSS, such that frequency interference can be reduced.

For example, at S120, for an overlapping part between the first BSS and the second BSS which can be called as OBSS, the plurality of APs may allocate resource based on acquired resource allocation information of each other such that the allocated resources are apart from each other in the time domain or in the frequency domain.

For example, a bandwidth of a BSS may be greater than an operation bandwidth of a STA, and thus an operation bandwidth allocated to an STA within an OBSS may be different from operation bandwidths allocated to the STA by one or more second APs. In this way, for the resource allocation, the allocation separation in the frequency domain is realized and frequency interference is reduced accordingly.

For another example, through S110, an STA within a second BSS for a second AP may use the same frequency band corresponding to the first BSS and the second BSS in the first time period. For performing the resource allocation, while the first AP allocates a resource(s) for a STA(s) within the OBSS in the first BSS, the first AP considers using frequency domain resources of the same frequency band corresponding to the two BSSs in the second time period, such that the allocated resources are apart from each other in the time domain and thus, frequency interference can be reduced.

In response to completing the resource allocation at S120, the resource allocation information may be transmitted, for example, the resource allocation information may be broadcast. For this case, it is convenient for the second AP or STAs to collect the resource allocation information of the first BSS, and it is also convenient for an STA that needs to use a corresponding resource for data transmission according to the resource allocation information, to determine information of a resource allocated to the STA by the first AP.

For example, the first AP may transmit the resource allocation information through a management frame. The management frame may include at least one of the following: a probe request frame, an association request frame, an authorization request frame and the like.

The resource allocation information may not be limited to being transmitted with the above-mentioned management frame. In some special cases, a data frame may be used to carry the resource allocation information as well.

Figure 3:
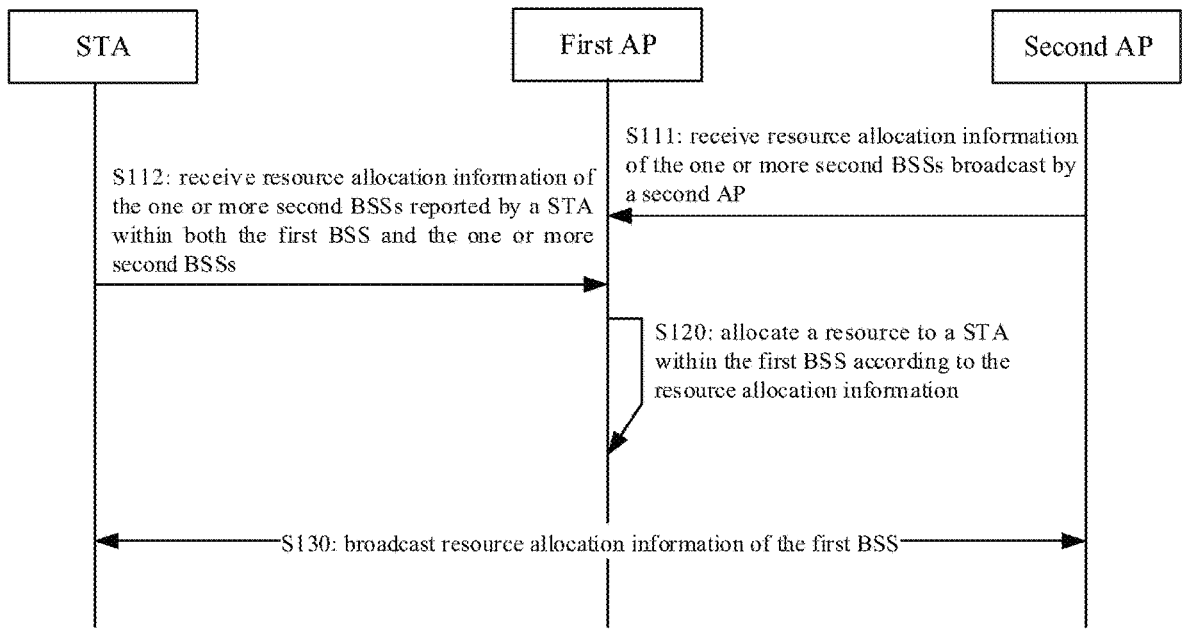
FIG. 3 is a schematic flowchart showing a data processing method according to an example of the present disclosure.

In some examples, as shown in FIG. 3, the S110 may include:

At S111, resource allocation information of the one or more second BSSs broadcast by a second AP is received; and/or, at S112, resource allocation information of the one or more second BSSs reported by an STA is received, where the STA is within both the first BSS and the one or more second BSSs.

In some examples, the second AP configured with the one or more second BSSs may broadcast its own resource allocation information, such that the first AP may receive by itself the resource allocation information broadcast by the second AP.

In some other examples, an STA may receive the resource allocation information broadcast by one or more second APs as well, and the STA reports the resource allocation information to the first AP. In this way, the first AP can collect the resource allocation information of the one or more second BSSs for other APs in two ways. In this way, while performing its own resource allocation for the first BSS at S120, resource consumption-avoidance measures can be performed to reduce frequency interference caused by allocating the same time-frequency resource to a plurality of STAs.

In some examples, S110 can include:
periodically receiving resource allocation information of the one or more second BSSs which is broadcast by the second AP configured with the second BSSs.

For example, each AP may periodically broadcast its own resource allocation information, so the first AP may periodically receive the resource allocation information of one or more second BSSs broadcast by other APs.

For example, with a predetermined time interval, for example, 20 ms or 10 ms and the like, as a period, the first AP may periodically receive the resource allocation information broadcast by one or more neighboring STAs around the first AP.

In some examples, the first AP can transmit request information to the second AP as well. In this case, S110 may include the first AP receiving resource allocation information transmitted by the second AP according to the request information.

In other examples, S110 may include:
receiving resource allocation information of the one or more second BSSs which is reported periodically by the STA within both the first BSS and the one or more second BSSs.

An STA may also periodically report resource allocation information received by itself from other STAs. For example, the STA may report, at a predetermined time interval such as 20 ms, 10 ms or 15 ms, the resource allocation information received by itself to the first AP.

Figure 4:
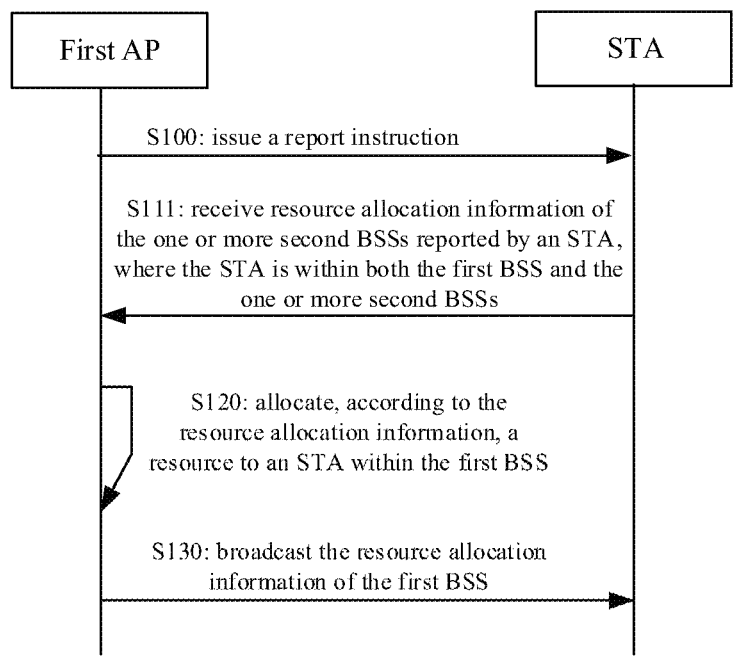
FIG. 4 is a schematic flowchart showing a data processing method according to an example of the present disclosure.

In some examples, as shown in FIG. 4, the method further includes:
At S100: a report instruction is issued.
S110 may include: receiving resource allocation information of the one or more second BSSs which is reported based on the report instruction by the STA within both the first BSS and the one or more second BSSs.

For example, in response to wireless communication being in a predetermined state, a report instruction is issued. For example, in a case that the first AP has an emergency service to be delivered to a UE, the report instruction is issued.

For example, in response to a circumstance that the first AP is to receive or transmit service data of Ultra Reliable Low Latency Communications (URLLC) service from or to a STA, due to the low latency of the service data of URLLC service, it is not appropriate to wait until that the STA reports resource allocation information or a second AP broadcasts resource allocation information, and then perform resource scheduling to transmit the service data of URLLC.

In this case, the first AP can issue a report instruction to the STA.

In response to receiving the report instruction, the STA may report, based on the report instruction, the resource allocation information of the one or more second BSSs. In this case, the resource allocation information received at S110 may be resource allocation information transmitted according to the report instruction.

In some embodiments, the S110 may include:
acquiring resource allocation information of the one or more second BSSs which use the same frequency band over multi-links as the first BSS for the first AP, where the multi-links correspond to operation bandwidths over different frequency bands or different operation bandwidths over a same frequency band.

For example, many STAs are capable of multi-links, and can establish a plurality of links with an AP or with different STAs.

A bandwidth corresponding to a link may indicate an operation bandwidth of a STA. For example, the operation bandwidth of the STA may be 20 MHz, 40 MHz, 80 MHz, 160 MHZ, 320 MHz or the like.

In examples of the present disclosure, there may be a plurality of frequency bands used by the first AP and the second AP. For example, taking the first AP and the second AP as Wi-Fi APs as an example, the frequency band used by the Wi-Fi APs may be 2.4 GHz frequency band or 5.8 GHz frequency band.

Generally, the bandwidth supported by an AP is greater than the operation bandwidth of a STA. For example, the bandwidth supported by an AP may be 320 MHz or even greater than 320 MHz.

In this case, the AP may configure a plurality of BSSs over one bandwidth, or the AP may configure a plurality of BSSs over different frequency bands.

In examples of the present disclosure, the received resource allocation information of second BSS may be resource allocation information of one or more second BSSs that is received by the STA with multi-links.

In some examples, the resource allocation information includes an identifier of the second BSS and resource allocation information of Resource Unit (RU), where the resource allocation information of RU at least includes resource location information of RU.

The resource location information may include frequency domain location information and/or time domain location information.

The frequency domain location information and/or the time domain location information can be indicated by an index of RU.

For example, the time domain location information may be indicated with the serial number of a slot, the serial number of a symbol or the like. The frequency domain location information may include the serial number of a carrier or a subcarrier and the like.

The resource allocation information of RU may further include at least one of:
information about an STA assigned with one or more RUs;
a start time of RU in time domain and a duration of RU in time domain; or
an index of an operation bandwidth for RU over multi-links.

The identifier of second BSS may include at least one of:
Basic Service Set IDentifier (BSSID), BSS color value or MAC address of an AP.

For the case of single link, the resource allocation information of RU may include: information about an STA assigned with one or more RUs, the information is, for example, an STA identifier. The resource allocation information of RU may further include an index of RU, a start time of RU in time domain and a duration of RU in time domain. For the case of single link, the resource allocation information of RU may not include an index of the operation bandwidth.

The resource allocation information of RU here may be resource scheduling information with a RU as the granularity of resource allocation.

The index of RU may include: a frequency domain index of RU and/or a time domain index of RU.

The index of the operation bandwidth for RU over multi-links can be referred to as a bandwidth index.

In some examples, the resource allocation information of RU further includes:

a link identifier of a link corresponding to RU.

In a single link scenario, one or more RU resources indicated in the resource allocation information of RU are all allocated to one link. For this case, the link identifier is not necessary to be reported or may be reported.

In a multi-links scenario, for distinguishing links corresponding to RUs, a link identifier may be carried in the resource allocation information of RU.

In some examples, S120 may include: determining, according to the resource allocation information, the number of BSSs which associate with an STA in an OBSS between the first BSS and the second BSSs; assigning, according to an Orthogonal Frequency-Division Multiple Access (OFDMA) mechanism, one or more RUs to the STA in the OBSS.

For example, an STA may be located in a coverage area of a plurality of BSSs. In this case, a coverage area between two or more BSSs is an overlapping coverage area, which may be referred to as OBSS.

Figure 5:
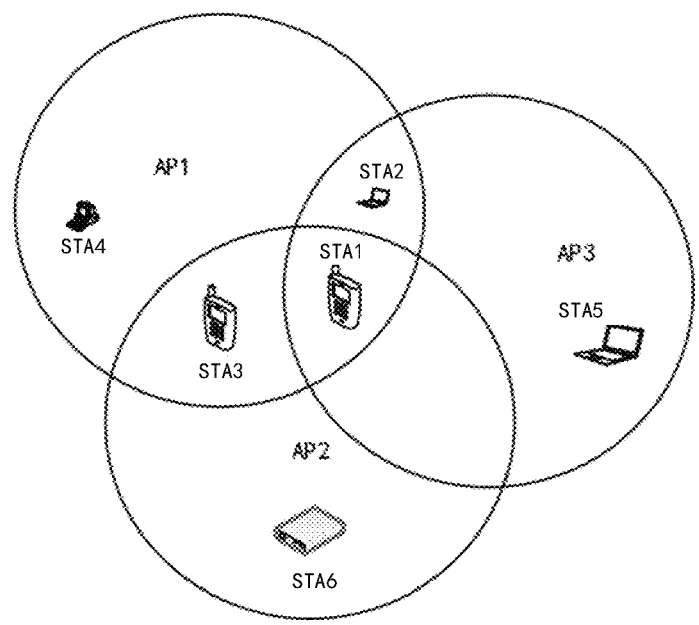
FIG. 5 is a schematic diagram showing stations within a plurality of BSSs.

As shown in FIG. 5, assuming that an AP is configured with one BSS, and AP1, AP2 and AP3 shown in FIG. 5, all form a respective BSS. There are two kinds of OBSS among this three BSSs, one indicates the OBSS among three BSSs at the same time; the other indicates the OBSS between two BSSs.

STA 1 is simultaneously located in the coverage area of three BSSs, STA 2 and STA 3 are simultaneously located in the coverage area of two BSSs, while STA 4, STA 5 and STA 6 are only located in the coverage area of one BSS. Therefore, STA 1 to STA 3 are all located in the OBSS. In this case, all of STA 1 to STA 3 can receive resource allocation information broadcast by more than one AP.

In this way, an STA within the OBSS reports resource allocation information received from one or more second APs to a first AP, or reports resource allocation information of the first AP to one or more second APs.

In some examples, as shown in FIG. 3, the method further includes:
broadcasting resource allocation information of the first BSS.

The first AP broadcasts its own resource allocation information for other APs to allocate resources, so as to reduce frequency interference.

Figure 6:
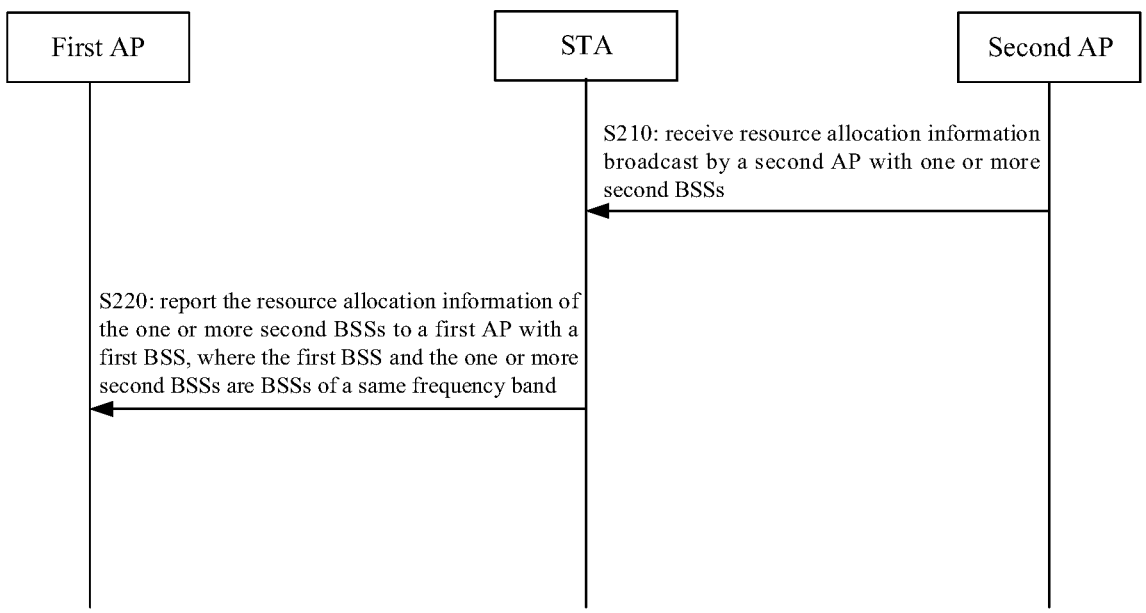
FIG. 6 is a schematic flowchart showing a data processing method according to an example of the present disclosure.

As shown in FIG. 6, the present example provides a data processing method, which can be applied to a station (STA) and includes:

At step S210, receiving resource allocation information of one or more second Basic Service Sets (BSSs) which is broadcast by a second Access Point (AP).

At step S220, reporting the resource allocation information of the one or more second BSSs to a first AP configured with a first BSS, where the first BSS and the one or more second BSSs are of the same frequency band.

The STA may receive resource allocation information of one or more BSSs, and then, for a BSS, reports resource allocation information of other BSSs to an AP corresponding to the BSS, so as to achieve resource allocated to different APs separating from each other and thus reduces frequency interference.

In some examples, S210 may include:
periodically reporting the resource allocation information of the one or more second BSSs to the first AP configured with the first BSS.

For example, a certain period is set and the STA reports, according to the period, the resource allocation information of the one or more second BSSs to the first AP.

In some examples, the method further includes:
At step S200: receiving a report instruction.

The S220 may include: according to the report instruction, reporting the resource allocation information of the one or more second BSSs to the first AP configured with the first BSS.

In some case of emergency, an AP may not wait for periodic reporting while issue a report instruction. In this case, a STA, in response to receiving the report instruction, may report the resource allocation information of the one or more second BSSs that have not yet been reported to the first AP.

In some examples, for the STA, periodic reporting and emergency reporting based on the report instruction can be used in combination. After the emergency reporting is completed, in response to a reporting time based on the reporting period coming, the STA will continue reporting, at the reporting time based on the reporting period, the resource allocation information of one or more second BSSs that have not been reported yet.

In a case that the STA does not detect the resource allocation information of a second BSS, the STA can simply not report or report an informative message indicating that the resource allocation information of the second BSS is not detected.

Figure 7:
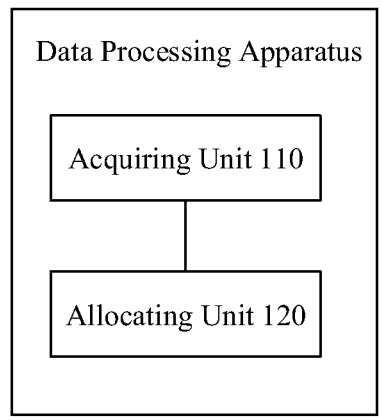
FIG. 7 is a block diagram showing a data processing apparatus.

As shown in FIG. 7, the present example provides a data processing apparatus which is applied to a first AP. The apparatus includes:
an acquiring unit 110, configured to acquire resource allocation information of one or more second Basic Service Sets (BSSs) that use a same frequency band as a first BSS for the first AP; and
an allocating unit 120, configured to allocate, according to the resource allocation information, a resource to a station (STA) within the first BSS.

In some examples, the acquiring unit 110 and the allocating unit 120 may be program units. In response to the program units being executed by a processor, the acquisition of the resource allocation information of the second BSSs and the resource allocation for the station within the first BSS can be realized.

In still other examples, the acquiring unit 110 and the allocating unit 120 may be a combination of hardware and software units. The combination of hardware and software units includes, but is not limited to, programmable arrays, where the programmable arrays can be complex programmable arrays or field programmable arrays.

In still other examples, the acquiring unit 110 and the allocating unit 120 may be pure hardware units, and the pure hardware units may include specialized integrated circuits.

In some examples, the acquiring unit 110 is configured to perform at least one of: receive resource allocation information of the one or more second BSSs which is broadcast by a second AP; or receive resource allocation information of the one or more second BSSs which is reported by an STA within both the first BSS and the one or more second BSSs.

In some examples, the acquiring unit 110 is configured to receive periodically the resource allocation information of the one or more second BSSs which is broadcast by the second AP configured with the second BSSs.

In some examples, the acquiring unit 110 is configured to receive resource allocation information of the one or more second BSSs which is periodically reported by the STA within both the first BSS and the one or more second BSSs.

In some examples, the apparatus further includes:
  a first transmitting unit, configured to issue a report instruction; and
  the acquiring unit 110 is configured to receive resource allocation information of the one or more second BSSs that is reported based on the report instruction by the STA within both the first BSS and the one or more second BSSs.

In some examples, the acquiring unit 110 is configured to acquire resource allocation information of the one or more second BSSs that use the same frequency band over multi-links as the first BSS for the first AP, wherein the multi-links correspond to operation bandwidths over different frequency bands or different operation bandwidths over a same frequency band.

For example, operation frequency bands of different BSSs can be different. For example, operation bandwidths of some BSSs lie in operation frequency bands of, for example, 2.4 GHz, 5 GHz or 6-7 GHz. Different BSSs can also have different operation bandwidths over each frequency band. For example, three 20 MHz operation bandwidths over 2.4 GHz represent link 1, link 2 and link 3 respectively.

In some examples, the resource allocation information includes: identifiers of the one or more second BSSs and resource allocation information of Resource Unit (RU), where the resource allocation information of RU at least includes resource location information of RU.

In some examples, the resource allocation information of RU further includes at least one of:
  information about an STA to which RU are assigned;
  a start time of RU in time domain and a duration of RU in time domain;
  an index of an operation bandwidth for RU over multi-links;
  a link identifier of a link corresponding to RU; or
  a number of RUs.

In some examples, the allocating unit 120 is configured to determine, according to the resource allocation information, a number of BSSs which associate with an STA within an Overlapping Basic Service Set (OBSS) between the first BSS and the second BSSs; and
  assign, according to an Orthogonal Frequency Division Multiple Access (OFDMA) mechanism, one or more RUs to the STA within the OBSS.

In some examples, the apparatus further includes:
  a broadcasting unit, configured to broadcast resource allocation information of the first BSS.

Figure 8:
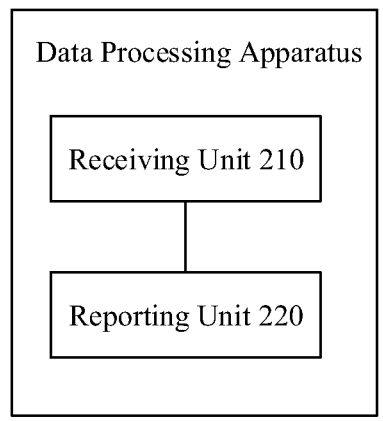
FIG. 8 is a block diagram showing a data processing apparatus.

As shown in FIG. 8, the present example provides a data process apparatus which is applied to a station. The apparatus includes:
  a receiving unit 210, configured to receive resource allocation information of one or more second Basic Service Sets (BSSs) which is broadcast by a second Access Point (AP); and
  a reporting unit 220, configured to report the resource allocation information of the one or more second BSSs to a first AP configured with a first BSS, where the first BSS and the one or more second BSSs are BSSs of a same frequency band.

In some examples, the receiving unit 210 and the reporting unit 220 may be program units. In response to the program units being executed by a processor, the receiving and reporting of the resource allocation information of the second BSSs can be realized.

In still other examples, the receiving unit 210 and the reporting unit 220 may be a combination of hardware and software units. The combination of hardware and software units includes, but is not limited to, programmable arrays, where the programmable arrays can be complex programmable arrays or field programmable arrays.

In still other examples, the receiving unit 210 and the reporting unit 220 may be pure hardware units, and the pure hardware units may include specialized integrated circuits.

In some examples, the reporting unit 220 is configured to report periodically the resource allocation information of the one or more second BSSs to the first AP configured with the first BSS.

In some examples, the receiving unit 210 is further configured to receive a report instruction; and
  the reporting unit 220 is configured to report, according to the report instruction, the resource allocation information of the one or more second BSSs to the first AP configured with the first BSS.

In conjunction with any of the above-mentioned examples, a specific example is provided below as, for the case of multi-links, by adopting OFDMA mechanism, different STAs within an OBSS are prevented from using the same RU at the same time, which suppresses frequency interference effectively and thus improves the effective utilization of the spectrum.

A data processing method provided by the present example may include:
  At step 1: an AP collects RU allocation information of other BSSs reported by a STA;
  At step 2: the AP periodically collects resource allocation information broadcast by other APs, which is specifically shown in the following table:

| BSS identifier | Link identifier | Allocated starting position for specific STA | Number of RUs | Link identifier | Allocated starting position for specific STA | Number of RUs | Start time | Duration |
|---|---|---|---|---|---|---|---|---|

| BSS identifier (color/ BSSID/ MAC address) | Link 1 | RU allocation start for specific STA | Number of RUs | ... | Link 2 | RU allocation start for specific STA | Number of RUs | ... | Start time | Duration |
|---|---|---|---|---|---|---|---|---|---|---|

The BSS identifier is an identifier of a BSS set up by an AP, for example, a Basic Service Set Identifier (BSSID), a BSS color value or a MAC address.

A starting position of a RU allocated to a STA, that is, RU allocation start for specific STA, indicates the RU allocated to an STA in a certain period of time and may include an Association Identifier (AID) or a MAC address of the STA.

Link identifier is for indicating each link as well as an operation frequency band of a BSS, such as 2.4 GHz, 5 GHz or 6-7 GHz. The link identifier is also for indicating different operation bandwidths for each frequency band, for example, three operation bandwidths of 20 MHz over 2.4 GHz may be respectively represented as link 1, link 2 and link 3.

Or an STA within an OBSS may collect the RU allocation information of the other BSSs.

The STA within the OBSS may collect information of communication resource like RUs allocated by one or more APs, and reports the collected information to the AP periodically or timely. A format of the collected information is shown in the table above.

At step 3: according to the information collected at steps 1 and 2, the AP is to schedule RU allocation of its own BSS. For example, according to the information collected in steps 1 and 2, the AP is to consider the following for allocating a RU(s) to a STA:

First, with the information collected by the STA in step 1, the AP may determine, according to the number of BSS identifiers, the number of BSSs with which the STA within the OBSS is associated. Second, according to the BSS identifier(s) collected by itself, the BSS identifier(s) collected by the STA and RU allocation information of other BSSs, the AP may determine RU allocation for the STA within the OBSS.

The examples of the present disclosure further provide a communication device, which includes:
a transceiver;
a memory; and
a processor connected to the transceiver and the memory respectively is configured to, by executing computer-executable instructions stored on the memory, perform the data processing method provided in any one of the above-mentioned technical solutions. For example, the data processing method shown in at least one of FIGS. 2 to 4 and FIG. 6 can be performed.

For example, the communication device can be the above-mentioned AP or STA.

The examples of the present disclosure further provide a non-transitory computer readable storage medium, where the non-transitory computer readable storage medium stores computer-executable instructions, in response to the computer-executable instructions being executed by a processor, the data processing method provided in any one of the above-mentioned technical solutions can be performed. For example, the data processing method shown in at least one of FIGS. 2 to 4 and FIG. 6 can be performed.

Figure 9:
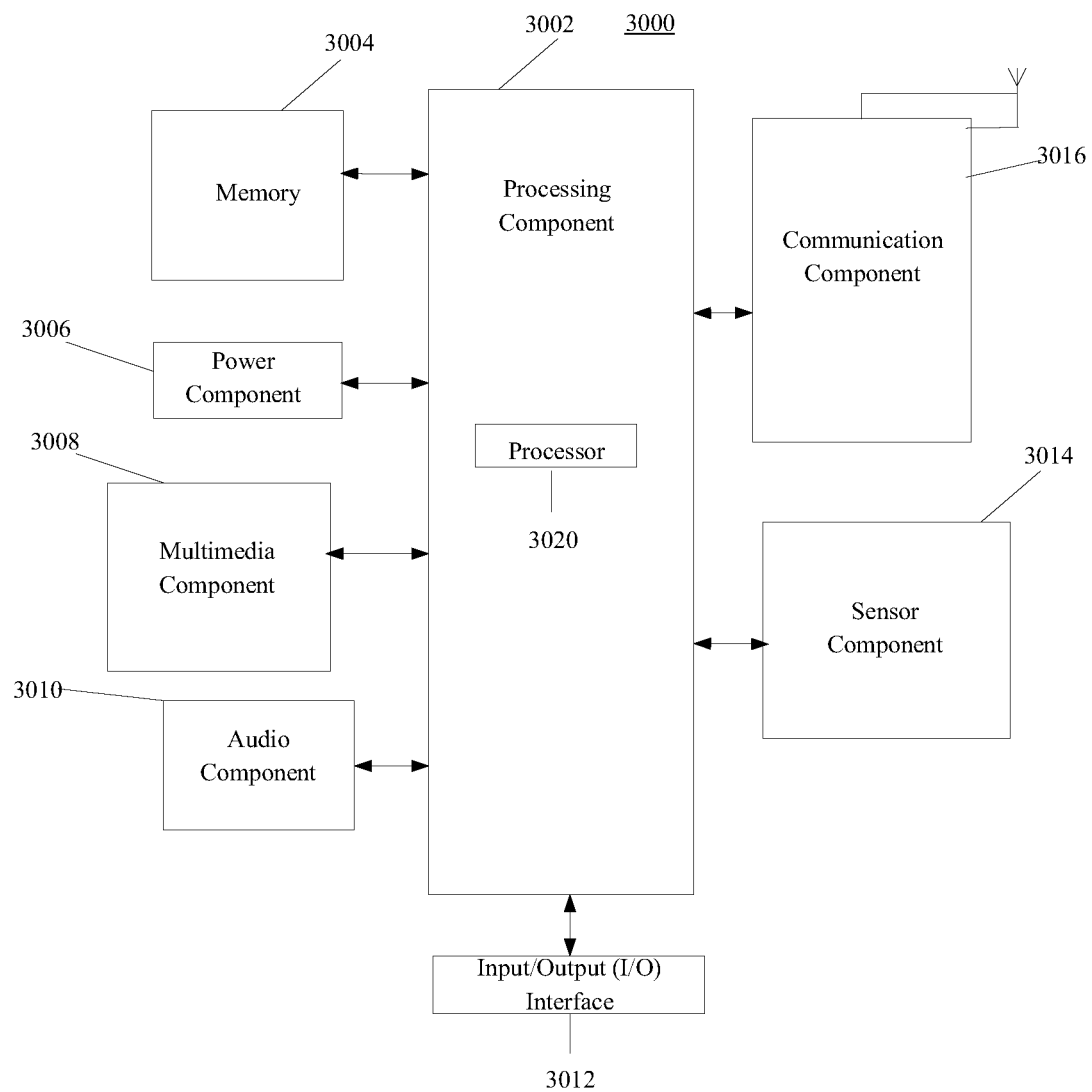
FIG. 9 is a block diagram showing a data processing apparatus.

FIG. 9 is a block diagram illustrating data processing 3000. For example, the apparatus 3000 may be a mobile phone, a computer, a digital broadcast terminal, a message transceiver, a game console, a tablet device, a medical device, a fitness device, a personal digital assistant, and the like.

With reference to FIG. 9, the data processing apparatus 3000 may include one or more of the following components: a processing component 3002, a memory 3004, a power component 3006, a multimedia component 3008, an audio component 3010, an input/output (I/O) interface 3012, a sensor component 3014 and a communication component 3016.

The processing component 3002 generally controls overall operations of the apparatus 3000, such as operations associated with display, phone calls, data communications, camera operations, recording operations and the like. The processing component 3002 may include one or more processors 3020 to execute instructions to complete all or part of the steps of the above methods. In addition, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any application or method, contact data, phonebook data, messages, pictures, videos, and so on operated on the apparatus 3000. The memory 3004 may be implemented by any type of volatile or non-volatile storage devices or a combination of the volatile and non-volatile storage devices, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, a compact disk and so on.

The power component 3006 supplies power for different components of the apparatus 3000. The power component 3006 may include a power supply management system, one or more power supplies, and other components associated with generating, managing and distributing power for the apparatus 3000.

The multimedia component 3008 includes a screen that provides an output interface between the apparatus 3000 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 3008 includes a front camera and/or a rear camera. When the apparatus 3000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some examples, the audio component 3010 also includes a loudspeaker for outputting an audio signal.

The I/O interface 3012 provides an interface between the processing component 3002 and a peripheral interface module which may be a keyboard, a click wheel, a button, or the like. These buttons may include, but are not limited to a home button, a volume button, a start button, and a lock button.

The sensor component 3014 includes one or more sensors for providing a status assessment in various aspects to the apparatus 3000. For example, the sensor component 3014 may detect an open/closed state of the apparatus 3000, and the relative positioning of components, for example, the components may be a display and a keypad of the apparatus 3000. The sensor component 3014 may also detect a change in position of the apparatus 3000 or a component of the apparatus 3000, the presence or absence of a user in contact with the apparatus 3000, the orientation or acceleration/deceleration of the apparatus 3000 and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some examples, the sensor component 3014 may also include an acceleration sensor, a gyro sensor, a magnetic sensor, a pressure sensor, a temperature sensor and the like.

The communication component 3016 is configured to facilitate wired or wireless communication between the apparatus 3000 and other devices. The apparatus 3000 may access a wireless network based on a communication standard, such as WiFi, 2G or 30G, or a combination of the above communication standards or the like. In an example, the communication component 3016 receives broadcast signals or broadcast associated information from an external broadcast management system via a broadcast channel. In an example, the communication component 3016 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, or other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above methods.

In an example, there is further provided a non-transitory computer readable storage medium including instructions, for example, a memory 3004 including instructions, where the above instructions may be executed by the processor 3020 of the apparatus 3000 to complete the above method. For example, the non-transitory computer readable storage medium may be Read Only Memory (ROM), Random Access Memory (RAM), CD-ROM, magnetic tape, floppy disk and optical data storage device and the like.

In technical solutions provided by examples of the present disclosure, a first Access Point (AP) configured with a first Basic Service Set (BSS) acquires resource allocation information of one or more second BSSs set up by one or more second APs and allocates resource for the first BSS based on this resource allocation information, such that the frequency interference between the first BSS and the second BSS using the same frequency band can be effectively reduced and the communication quality can be improved.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for data processing, performed by a first Access Point (AP), the method comprising:
   acquiring resource allocation information of one or more second Basic Service Sets (BSSs) that use a same frequency band as a first BSS for the first AP, wherein the resource allocation information is reported by a station (STA) within both the first BSS and the one or more second BSSs; and
   allocating, according to the resource allocation information, a resource to the STA within the first BSS;
   wherein the allocating, according to the resource allocation information, a resource to the STA within the first BSS comprises:
   determining, according to the resource allocation information, a number of BSSs which associate with the STA in an Overlapping Basic Service Set (OBSS) between the first BSS and the second BSSs; and
   assigning, according to an Orthogonal Frequency Division Multiple Access (OFDMA) mechanism based on the number of BSSs determined, one or more Resource Units (RUs) to the STA within the OBSS, to prevent different STAs within the OBSS from using a same RU at a same time.

2. The method according to claim 1, wherein acquiring the resource allocation information of the one or more second BSSs that use the same frequency band as the first BSS for the first AP further comprises:
   receiving resource allocation information of the one or more second BSSs which is broadcast by a second AP.

3. The method according to claim 2, wherein receiving the resource allocation information of the one or more second BSSs which is broadcast by the second AP comprises:

receiving periodically the resource allocation information of the one or more second BSSs which is broadcast by the second AP configured with the second BSSs.

4. The method according to claim 1, wherein receiving the resource allocation information of the one or more second BSSs which is reported by the STA within both the first BSS and the one or more second BSSs comprises:

receiving the resource allocation information of the one or more second BSSs which is periodically reported by the STA within both the first BSS and the one or more second BSSs.

5. The method according to claim 1, further comprising: issuing a report instruction;

wherein receiving the resource allocation information of the one or more second BSSs which is reported by the STA within both the first BSS and the one or more second BSSs comprises:

receiving resource allocation information of the one or more second BSSs that is reported based on the report instruction by the STA within both the first BSS and the one or more second BSSs.

6. The method according to claim 1, wherein acquiring resource allocation information of the one or more second BSSs that use the same frequency band as the first BSS for the first AP comprises:

acquiring resource allocation information of the one or more second BSSs that use the same frequency band over multi-links as the first BSS for the first AP, wherein the multi-links correspond to operation bandwidths over different frequency bands or different operation bandwidths over a same frequency band.

7. The method according to claim 1, the resource allocation information comprises: identifiers of the one or more second BSSs and resource allocation information of RU, wherein the resource allocation information of RU at least comprises resource location information of RU.

8. The method according to claim 7, wherein the resource allocation information of RU further comprises at least one of:

information about an STA assigned with RU;
a start time of RU in time domain and a duration of RU in time domain;
an index of an operation bandwidth for RU over multi-links;
a link identifier of a link corresponding to RU; or
a number of RUs.

9. The method according to claim 1, further comprising: broadcasting resource allocation information of the first BSS.

10. A method for data processing performed by a station (STA), the method comprising:

receiving resource allocation information of one or more second Basic Service Sets (BSSs) which is broadcast by a second Access Point (AP); and reporting the resource allocation information of the one or more second BSSs to a first AP configured with a first BSS, wherein the first BSS and the one or more second BSSs are of a same frequency band;

wherein the resource allocation information is for the first AP to:

determine, according to the resource allocation information, a number of BSSs which associate with the STA in an Overlapping Basic Service Set (OBSS) between the first BSS and the second BSSs, and assign, according to an Orthogonal Frequency Division Multiple Access (OFDMA) mechanism based on the number of BSSs determined, one or more Resource Units (RUs) to the STA within the OBSS, to prevent different STAs within the OBSS from using a same RU at a same time.

11. The method according to claim 10, wherein reporting the resource allocation information of the one or more second BSSs to the first AP configured with the first BSS comprises:

reporting periodically the resource allocation information of the one or more second BSSs to the first AP configured with the first BSS.

12. The method according to claim 10, further comprising:

receiving a report instruction;
wherein reporting the resource allocation information of the one or more second BSSs to the first AP configured with the first BSS comprises:
reporting, according to the report instruction, the resource allocation information of the one or more second BSSs to the first AP configured with the first BSS.

13. A communication device, comprising:
a transceiver;
a memory; and
one or more processors connected to the transceiver and the memory,
wherein the one or more processors are collectively configured to:
acquire resource allocation information of one or more second Basic Service Sets (BSSs) that use a same frequency band as a first BSS for an first AP, wherein the resource allocation information is reported by a station (STA) within both the first BSS and the one or more second BSSs; and
allocate, according to the resource allocation information, a resource to the STA within the first BSS;
wherein the resource is allocated by:
determining, according to the resource allocation information, a number of BSSs which associate with the STA in an Overlapping Basic Service Set (OBSS) between the first BSS and the second BSSs; and
assigning, according to an Orthogonal Frequency Division Multiple Access (OFDMA) mechanism based on the number of BSSs determined, one or more Resource Units (RUs) to the STA within the OBSS, to prevent different STAs within the OBSS from using a same RU at a same time.

14. A non-transitory computer readable storage medium, wherein the non-transitory computer readable storage medium stores computer-executable instructions, in response to the computer-executable instructions being executed by a processor of the first AP, cause the AP to perform the method according to claim 1.

15. The communication device according to claim 13, wherein acquiring the resource allocation information of the one or more second BSSs that use the same frequency band as the first BSS for the first AP comprises at least one of:

receiving resource allocation information of the one or more second BSSs which is broadcast by a second AP.

16. The communication device according to claim 13, wherein the one or more processors are further collectively configured to:

issue a report instruction;
wherein the resource allocation information of the one or more second BSSs which is reported by the STA within both the first BSS and the one or more second BSSs comprises:

receiving the resource allocation information of the one or more second BSSs that is reported based on the report instruction by the STA within both the first BSS and the one or more second BSSs.

17. A communication device, comprising:
a transceiver;
a memory that stores computer-executable instructions; and
a processor connected to the transceiver and the memory, wherein the computer-executable instruction when executed by the processor cause the communication device to act as the STA and perform the method according to claim 10.

18. A non-transitory computer readable storage medium, wherein the non-transitory computer readable storage medium stores computer-executable instructions, in response to the computer-executable instructions being executed by a processor of the STA, cause the STA to perform the method according to claim 10.

* * * * *

UNITED STATES PATENT AND TRADEMARK OFFICE
CERTIFICATE OF CORRECTION

PATENT NO. : 12,245,210 B2
APPLICATION NO. : 17/787160
DATED : March 4, 2025
INVENTOR(S) : Xiandong Dong Page 1 of 1

It is certified that error appears in the above-identified patent and that said Letters Patent is hereby corrected as shown below:

In the Specification

In Column 7, Line 44, delete "this three" and insert -- these three --, therefor.

In Column 8, Line 27, delete "some case" and insert -- some cases --, therefor.

In Column 8, Line 28, delete "issue" and insert -- issuing --, therefor.

Signed and Sealed this
Thirteenth Day of May, 2025

Coke Morgan Stewart
*Acting Director of the United States Patent and Trademark Office*